United States Patent [19]
McDowell et al.

[11] 3,864,399
[45] Feb. 4, 1975

[54] CATALYTIC REDUCTION OF NITROPARAFFINS TO OXIMES AND CATALYST THEREFOR

[75] Inventors: John W. McDowell, Odessa, Tex.; Leon O. Winstrom, East Aurora, N.Y.

[73] Assignee: Allied Chemical Corporation, New York, N.Y.

[22] Filed: Jan. 29, 1973

[21] Appl. No.: 327,554

Related U.S. Application Data

[62] Division of Ser. No. 863,357, Oct. 2, 1969, abandoned.

[52] U.S. Cl. ............................ 260/566 A, 252/475
[51] Int. Cl. ........................................ C07c 131/04
[58] Field of Search ................ 260/566 A; 252/475

[56] References Cited
UNITED STATES PATENTS 2,034,077  3/1936  Arnold et al. ...................... 252/475
3,366,683  1/1968  Johnson et al. ...................... 252/475

OTHER PUBLICATIONS
Grundmann, Angew. Chem. Vol. 62, pp. 558–560 (1950).

Primary Examiner—Leon Zitver
Assistant Examiner—Gerald A. Schwartz
Attorney, Agent, or Firm—Michael S. Jarosz; Ernest D. Buff

[57] ABSTRACT

Preparation of oximes, particularly cyclohexanone oxime, by the low pressure, liquid phase reduction particularly primary and secondary nitroparaffins and nitrocycloparaffins with hydrogen in the presence of a novel copper-zinc-silver catalyst. The oxime products of this invention can be used in paints to prevent premature skin formation. In addition, the cyclohexanone oxime is valuable as an intermediate in the production of caprolactam, which is used for the manufacture of synthetic fibers and plasticizers.

11 Claims, No Drawings

CATALYTIC REDUCTION OF NITROPARAFFINS TO OXIMES AND CATALYST THEREFOR

BACKGROUND OF THE INVENTION

Heretofore, the liquid phase reduction of primary and secondary nitroparaffins to oximes has required the use of high pressures, i.e., greater than 300 p.s.i., (see U.S. Pat. Nos. 2,711,427 and 3,267,142); or the use of a two-step reaction in which the nitroparaffin was first reduced to the corresponding amine, which was then separated and oxidized to the oxime, (see U.S. Pat. No. 2,886,596). Because of the need for pressure vessels or additional process steps, the above methods are not particularly suitable for commercial operation.

Accordingly, it is an object of the present invention to provide a new low pressure, liquid phase method for producing oximes from primary and secondary nitroparaffins which avoids the shortcomings of the prior art methods.

A further object of the present invention is to provide a novel catalyst which can be utilized in the production of oximes from primary and secondary nitroparaffins at low pressures.

A more specific object is to provide a new low pressure, liquid phase method for producing cyclohexanone oximes from nitrocyclohexane.

SUMMARY OF THE INVENTION

We have now discovered that liquid phase primary and secondary nitroparaffins and nitrocycloparaffins may be reduced at low pressures to their corresponding oximes with hydrogen in the presence of a novel copper-zinc-silver catalyst. The present invention gives superior yields of oxime product and low yields of undesired amine by-product.

The invention process comprises reacting the nitroparaffin with hydrogen in the presence of a novel copper-zinc-silver catalyst at a pressure less than about 300 p.s.i. The oxime product is then recovered from the reaction mixture by any of the conventional methods known to those skilled in the art.

The oxime products of this invention can be used in paints to prevent premature skin formation. In addition, the cyclohexanone oxime product is valuable as an intermediate in the production of caprolactam which is used for the manufacture of synthetic fibers and plasticizers.

DETAILED DESCRIPTION

The starting materials used in this process are primary and secondary nitroparaffins containing at least two carbon atoms, preferably from 2 to 6 carbon atoms, for example nitroethane, 1-nitropropane, 2-nitropropane, 2-nitrobutane, and the like, and nitrocycloparaffins, for example, nitrocyclohexane. Most preferred is the reduction of nitrocyclohexane to cyclohexanone oxime. In this specification and in the appended claims, the term nitroparaffin is used to connote the primary and secondary nitroparaffins and nitrocycloparaffins described above.

The process comprises bubbling hydrogen gas through liquid nitroparaffin in the presence of the hereinafter described copper-zinc-silver catalyst of this invention. When the reaction is complete, the product solution may be separated from the catalyst in any suitable manner, e.g., by filtration or decantation. The catalyst can be reused, if desired. The oxime may then be recovered from the product solution by any of the conventional methods known to those skilled in the art, e.g., by fractional distillation.

Preferably, the nitroparaffin starting material is dispersed in a suitable solvent. The volume ratio of solvent to nitroparaffin ranges from 0.25:1 to 10:1, preferably from 1:1 to 5:1. The suitable solvent should be nonreactive and should be liquid at the reaction conditions of temperature and pressure, e.g., cyclohexanol. Most preferred is that the solvent be the amine derivative of the nitroparaffin starting material so as to have the effect of further inhibiting the conversion of nitroparaffin to amine. For example, the preferred solvent for the reduction of nitrocyclohexane is cyclohexylamine. The use of a solvent, however, is not critical to the reaction which may be run in the absence of any solvent.

An alkylaryl sulfonate detergent may be added to the reaction solution if desired, to aid in preventing buildup of catalyst poisons. An example of such a detergent is the alkali metal salt of the $C_{10}$ to $C_{14}$ linear alkyl benzene sulfonic acid, commercially available as Nacconol 60 S. The volume ratio of detergent to nitroparaffin usually varies from about 0.0:1 to about 0.20:1.

The hydrogen is usually added in at least about stoichiometric amounts, i.e., the mole ratio of hydrogen to nitroparaffin is at least about 1.0:1. Generally a sufficient excess of hydrogen is used so as to carry off the water formed during the reduction reaction. The mole ratio of hydrogen to nitroparaffin preferably ranges from about 1.5:1 to about 50:1, most preferably from about 2:1 to about 15:1. The excess hydrogen may be dried and recycled, if desired, thus reducing the net amount of fresh hydrogen required for carrying off the water.

In contrast to the prior art methods for liquid phase reduction of nitroparaffins to oximes, which generally specify pressures above 300 p.s.i.g., preferably 500 to 1500 p.s.i.g., to obtain satisfactory yields, the process of the instant invention may be run at pressures below 300 p.s.i.g. while still maintaining high yields of oxime and low yields of amine by-product. Generally the process may be run at pressures ranging from atmospheric to about 300 p.s.i.g., preferably from about 5 to about 150 p.s.i.g., most preferably from about 60 to about 90 p.s.i.g. If desired, however, the instant process may also be run at higher pressures, up to 4000 p.s.i.g.

Reaction temperatures range from about 20°C. up to the degradation temperature of the oxime product, preferably from about 50°C. to about 120°C., most preferably from about 85°C. to about 110°C.

Time periods required for production of optimum amounts of oxime will vary depending on the particular nitroparaffin feed and the temperature and pressure used. Generally, periods of time ranging from ½ hour to 24 hours allow optimum production of the oxime.

The novel catalyst of this invention is a copper-zinc-silver catalyst which contains about 55 to 75 weight percent copper, about 20 to 40 weight percent zinc and about 0.1 to 10 weight percent silver; preferably the catalyst contains about 60 to 70 weight percent copper, about 30 to 37 weight percent zinc, and about 0.5 to 3 weight percent silver; and most preferably the catalyst contains about 65.5 weight percent copper, about 33.5 weight percent zinc and about 1 weight percent silver. The catalyst may be employed in the above described reaction in catalytically effective amounts, which usually fall in the range of about 0.05% to about 15% by weight based on nitroparaffin feed, preferably about 0.5% to about 10.

The catalyst of this invention may be prepared as a Raney type catalyst by making an alloy of aluminum, zinc, copper and silver wherein the aluminum is melted and the other metals are dissolved in the melt. The melt is then cooled and the ingot obtained is ground to a powder of from about 8 to about 115 mesh, preferably from about 60 to about 100 mesh, which is then suspended in distilled water. The suspension is agitated while passing a stream of hydrogen through it in sufficient amount to saturate the water with hydrogen. An aqueous solution of alkali metal hydroxide, preferably sodium or potassium hydroxide, is then gradually added to the stirred suspension to leach out the aluminum present in the alloy. The moles of alkali metal hydroxide used preferably are at least equal to the moles of aluminum in the alloy and are added gradually so as to maintain the solution at a temperature below its boiling point. The solution is then heated at about 90°–100°C. for a time sufficient to complete the leaching of the aluminum which is usually indicated by the cessation of bubbling in the solution. The catalyst suspension is then cooled and thoroughly washed with distilled water until the wash water is alkali free. The catalyst is then stored under distilled water until ready to use. Care must be taken to always keep the catalyst wet or under a reducing atmosphere because of its pyrophoric nature.

Alternatively, a coprecipitated form of the catalyst may be prepared by conventional methods wherein copper, zinc and silver salts are coprecipitated, washed, dried, ground and then reduced to the metallic state. For example, the carbonates of copper, zinc and silver may be coprecipitated by reacting ammonium carbonate with a solution of the soluble salts of copper, zinc and silver and cooling the resultant solution below its saturation temperature. The preferred soluble salts are the nitrates and the acetates. The coprecipitated salts, after being washed and dried, are ground to a powder of about 8 to about 115 mesh, preferably about 60 to about 100 mesh, and then heated in a hydrogen atmosphere at a temperature sufficient to reduce the copper, zinc and silver precipitates to their metallic states. Preferably the salts are slowly heated to about 250°C. over a period of about 8 to 24 hours, held at 250°C. for about 2 hours, and then slowly cooled to about 20°C. over a period of about 6 to 10 hours.

The invention can be more fully understood by reference to the following examples.

EXAMPLE 1

A copper-zinc-silver Raney type catalyst was prepared by making an alloy comprising 142 grams of aluminum, 65 grams of zinc, 127 grams of copper and 2.5 grams of silver. The aluminum was melted and the other metals dissolved in the melt. The ingot obtained was ground to a powder and screened to 80 mesh. This powder was suspended in 300 ml of distilled water. The suspension was then agitated while passing a hydrogen stream through it for 5 minutes. After the hydrogen flow was stopped, a solution of 100 grams of NaOH in 200 ml of distilled water was added slowly to the stirred suspension over a period of 1.5 hours to leach out the aluminum present in the alloy. The rate of NaOH addition was adjusted so as to hold the temperature of the suspension at 70°–90°C. After addition of the NaOH was complete, the suspension was heated at 90°–100°C. for 15 hours. The catalyst suspension was then cooled and washed with distilled water by decantation about 25 times over a period of 1 week. The catalyst was stored under distilled water. Catalyst composition was about 65.5 weight percent copper, about 33.5 weight percent zinc and about 1.0 weight percent silver.

EXAMPLE 2

A stainless steel reactor was charged with 100 ml of nitrocyclohexane, 400 ml of cyclohexylamine, 10 ml of Nacconol 60 S (an alkylaryl sulfonate detergent), and 4 g. of a Cu-Zn-Ag Raney type catalyst, prepared according to the method described in Example 1. The catalyst contained, by weight, about 65.5% copper, about 33.5% zinc and about 1% silver. The mixture was heated to between 93° and 99°C. at 70 p.s.i.g. and agitated while hydrogen was bubbled through the mixture at a rate of about 4.0 cfh. After 3.3 hours the rection was stopped and the reaction product filtered to remove the catalyst. Analysis showed 63% of the nitrocyclohexane feed converted to cyclohexanone oxime.

EXAMPLE 3

A stainless steel reactor was charged with 100 ml of nitrocyclohexane, 400 ml of cyclohexylamine, 4 grams of Cu-An-Ag Raney type catalyst, and 2.5 ml of Nacconol 60

S detergent. The catalyst, prepared as described in Example 1, contained, by weight, about 65.5% copper, about 33.5% zinc, and about 1.0% silver. The mixture was heated to between 90° and 94°C. at 70 p.s.i.g. and agitated while hydrogen was bubbled through the mixture at a rate of 14 cfh. After 3 hours the reaction was stopped and the reaction product filtered to remove the catalyst. Analysis showed 90% of the nitrocyclohexane feed was converted to cyclohexanone oxime.

EXAMPLE 4

The procedure of Example 2 is repeated using each of the following nitro-compounds and their corresponding amines in place of, respectively, the nitrocyclohexanone and cyclohexylamine of Example 2. Results substantially similar to those of Example 2 are obtained.

| Nitro-compound | Amine solvent |
| --- | --- |
| nitro ethane | ethyl amine |
| 1-nitropropane | 1-propylamine |
| 2-nitropropane | 2-propylamine |
| 2-nitrobutane | 2-butylamine |

EXAMPLE 5

A copper-zinc-silver coprecipitated type catalyst is prepared by making an aqueous solution containing about 330 grams of copper as copper nitrate, 168 grams of zinc as zinc nitrate, and 5 grams of silver as silver nitrate in about 2000 ml of distilled water. The solution is cooled to about 5°C. and agitated. To this is added a solution containing 900 grams of $(NH_4)_2CO_3$ in 5000 ml of distilled water at 5°C. Agitation is continued for 1 hour. The combined solutions are then filtered and the filter cake washed with water. The filter cake is suspended, in water, heated to about 85°C. for about 18 hours, filtered again, and the new filter cake washed with water. The cake is then vacuum dried at about 90°C. and the dry cake is ground and screened to about 100 mesh. The salts are then reduced to their metallic state by heating the ground cake to 250°C. in a hydrogen atmosphere over a period of 24 hours, holding at 250°C. for 2 hours, and then cooling to 20°C. over a period of 10 hours. The resultant catalyst contains, by weight, about 65.5% copper, 33.5% zinc and 1.0% silver.

EXAMPLE 6

The procedure of Example 2 is repeated using the coprecipitated type catalyst, prepared as described in Example 5, rather than the Raney type catalyst. The catalyst contains, by weight, about 65.5% copper, about 33.5% zinc, and about 1.0% silver. Results substantially similar to those of Example 2 are obtained.

We claim:

1. A process for the production of an oxime which comprises contacting a nitroparaffin selected from the group consisting of primary and secondary nitroparaffins containing at least two carbon atoms and nitrocyclohexane with hydrogen in the presence of a catalyst which comprises about 55 to 75 weight percent copper, about 20 to 40 weight percent zinc, and about 0.1 to 10 weight percent silver at a pressure less than about 300 p.s.i.g. and a reaction temperature within the range of about 20°C. to the degradation temperature of said oxime.

2. The process of claim 1, wherein the nitroparaffin is selected from the group consisting of nitroethane, 1-nitropropane, 2-nitropropane and 2-nitrobutane.

3. The process of claim 1, wherein the nitroparaffin is nitrocyclohexane.

4. The process of claim 1, wherein the catalyst comprises about 60 to 70 weight percent copper, about 30 to 37 weight percent zinc and about 0.5 to 3 weight percent silver.

5. The process of claim 4 wherein the pressure ranges from about 5 p.s.i.g. to about 150 p.s.i.g.

6. The process of claim 5, wherein the nitroparaffin is selected from the group consisting of nitroethane, 1-nitropropane, 2-nitropropane, and 2-nitrobutane.

7. The process of claim 5, wherein the nitroparaffin is nitrocyclohexane.

8. The process of claim 4, wherein the reaction temperature ranges from about 50°C. to about 120°C., and the pressure ranges from about 60 p.s.i.g. to about 90 p.s.i.g.

9. The process of claim 8, wherein the nitroparaffin is nitrocyclohexane.

10. The process of claim 9, wherein the nitrocyclohexane is dispersed in cyclohexylamine.

11. The process of claim 10, wherein the reaction temperature ranges from about 85°C. to about 110°C.

* * * * *